US007062371B2

(12) United States Patent
Gault et al.

(10) Patent No.: US 7,062,371 B2
(45) Date of Patent: Jun. 13, 2006

(54) METHOD AND SYSTEM FOR PROVIDING LOCATION SPECIFIC FUEL EMISSIONS COMPLIANCE FOR A MOBILE VEHICLE

(75) Inventors: Thomas A. Gault, Troy, MI (US); Bruce A. Groskreutz, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/921,569

(22) Filed: Aug. 19, 2004

(65) Prior Publication Data

US 2006/0041370 A1 Feb. 23, 2006

(51) Int. Cl.
*B60T 7/12* (2006.01)

(52) U.S. Cl. ....................................... 701/109; 701/114

(58) Field of Classification Search ................ 701/101, 701/103, 109, 114, 115; 180/167
See application file for complete search history.

(56) References Cited

U.S. PATENT DOCUMENTS 5,420,592 A 5/1995 Johnson
5,477,827 A 12/1995 Weisman, II et al.
5,612,882 A 3/1997 LeFebvre et al.
6,112,151 A * 8/2000 Kruse ......................... 701/115
6,164,125 A * 12/2000 Kawase et al. ............ 73/118.1
6,181,253 B1 1/2001 Eschenbach et al.
6,182,617 B1 2/2001 Bigcharles
6,259,986 B1 7/2001 Kotwicki
6,516,774 B1 2/2003 Zur Loye et al.
6,560,528 B1 5/2003 Gitlin et al.
6,575,148 B1 6/2003 Bhargava et al.
6,666,191 B1 12/2003 Nakagawa et al.
6,865,472 B1 * 3/2005 Nakamura .................. 701/108
2003/0076369 A1 4/2003 Resner et al.
2003/0135304 A1 7/2003 Sroub et al.
2004/0036601 A1 2/2004 Obradovich
2004/0090121 A1 5/2004 Simonds et al.
2004/0093155 A1 5/2004 Simonds et al.

FOREIGN PATENT DOCUMENTS

WO WO 00/40038 7/2000

OTHER PUBLICATIONS

U.S. Appl. No. 10/948,687, Ampunan, N. et al.

* cited by examiner

*Primary Examiner*—John T. Kwon
(74) *Attorney, Agent, or Firm*—Cardinal Law Group

(57) ABSTRACT

A method and system for providing location specific fuel emissions compliance for a mobile vehicle including determining a mobile vehicle location, determining a current emissions zone based on the mobile vehicle location, determining at least one location specific emissions parameter based on the current emissions zone, and modifying at least one mobile vehicle function based on the location specific emissions parameter.

17 Claims, 4 Drawing Sheets

METHOD AND SYSTEM FOR PROVIDING LOCATION SPECIFIC FUEL EMISSIONS COMPLIANCE FOR A MOBILE VEHICLE

FIELD OF THE INVENTION

This invention relates generally to control of mobile vehicle fuel emissions. In particular the invention relates to a method and system for providing location specific fuel emissions compliance for a mobile vehicle.

BACKGROUND OF THE INVENTION

Fuel emission requirements can vary from one area to another and from one municipality to another. Mobile vehicles are sold that meet particular emissions standards. If that mobile vehicle is moved to an area that has differing standards, the mobile vehicle may have to be modified to meet these new standards.

Some modifications can be made to a traditional gasoline powered mobile vehicle to adjust the level of emissions from the mobile vehicle. With the advent of hybrid powered mobile vehicles and alternative fuel sources, control of emission levels is further enhanced. This capability also opens the door for stricter air quality standards. Some urban areas desire stricter air quality standards than those required by state and federal government regulations in order to meet air quality goals. If a mobile vehicle could adjust its fuel emissions automatically, based on where it was traveling, that capability would further support efforts by certain locales in meeting air quality standards.

In some cases mobile vehicles are limited in the availability of alternate fuels. Mobile vehicles that require a certain fuel may have difficulty in finding an available fuel source or refueling station. If the location and availability of fuel sources is known, a mobile vehicle could tailor its fuel consumption to use clean burning fuels in preference to those that produce more emissions. When the mobile vehicle travels away from an area where cleaner burning fuels are available, it can switch to burning a different and more available fuel.

It is therefore desirable to provide a system and system for providing location specific fuel emissions compliance for a mobile vehicle that overcomes the limitations, challenges, and obstacles described above.

SUMMARY OF THE INVENTION

One aspect of the present invention provides a method for providing location specific fuel emissions compliance for a mobile vehicle comprising determining a mobile vehicle location, determining a current emissions zone based on the mobile vehicle location, determining at least one location specific emissions parameter based on the current emissions zone, and modifying at least one mobile vehicle function based on the location specific emissions parameter.

Another aspect of the present invention provides a system for providing location specific fuel emissions compliance for a mobile vehicle comprising means for determining a mobile vehicle location, means for determining a current emissions zone based on the mobile vehicle location, means for determining at least one location specific emissions parameter based on the current emissions zone, and means for modifying at least one mobile vehicle function based on the location specific emissions parameter.

A third aspect of the present invention provides a computer readable medium storing a computer program including computer readable code for providing location specific fuel emissions compliance for a mobile vehicle comprising determining a mobile vehicle location, determining a current emissions zone based on the mobile vehicle location, determining at least one location specific emissions parameter based on the current emissions zone, and modifying at least one mobile vehicle function based on the location specific emissions parameter.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
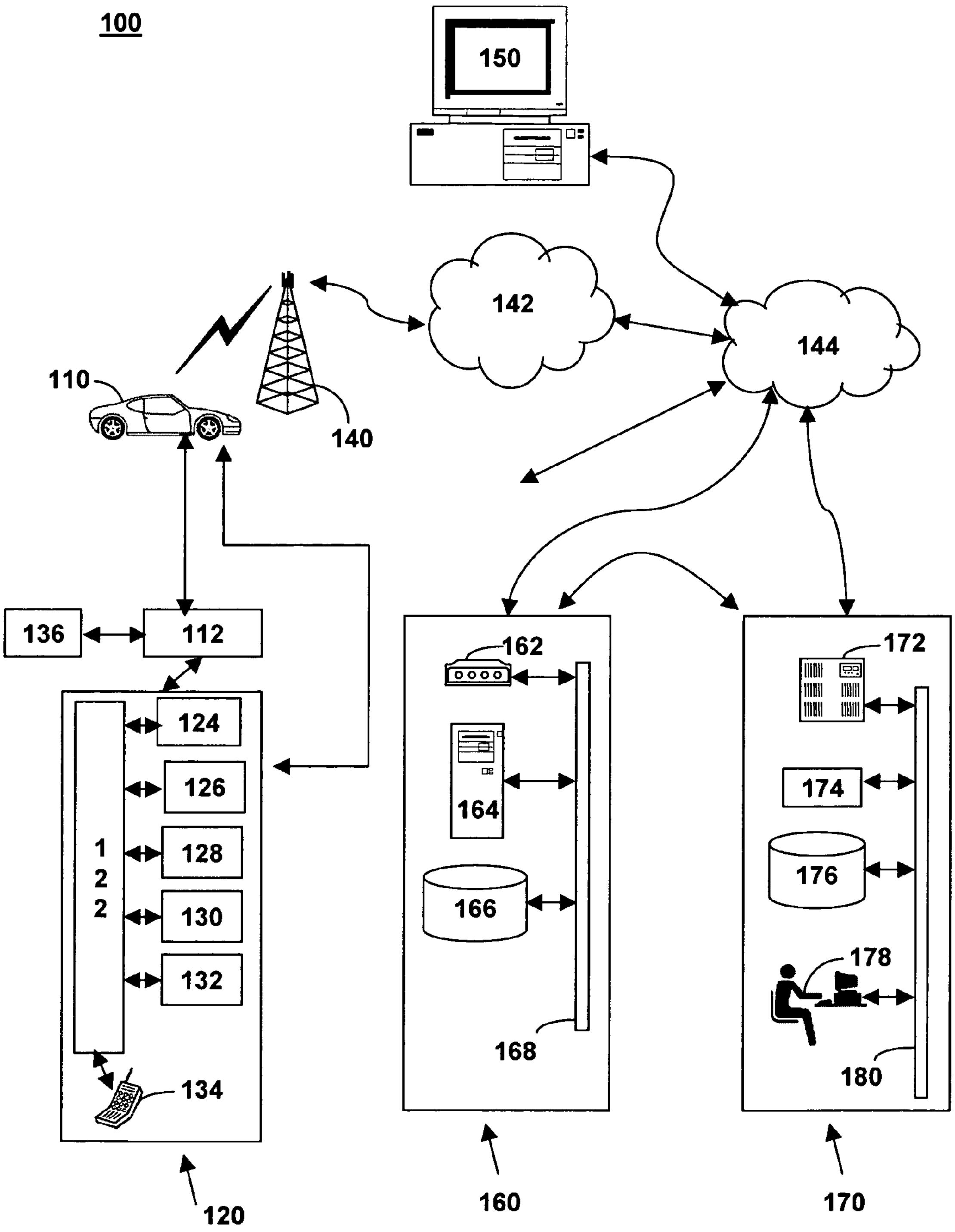
FIG. 1 is a schematic diagram of one embodiment a system for providing location specific fuel emissions compliance for a mobile vehicle in accordance with the present invention.

FIG. 1 illustrates one embodiment of system for providing location specific fuel emissions compliance for a mobile vehicle, in accordance with the present invention at 100. Location specific fuel emissions compliance system includes a mobile vehicle communication unit (MVCU) 110, a mobile vehicle communication network 112, a telematics unit 120, one or more wireless carrier systems 140, one or more communication networks 142, one or more land networks 144, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. A display may be embedded in MVCU 110. The display may be a dialed digital display such as a radio unit or an instrument panel. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a mobile vehicle communication network 112, sends signals to various units of equipment and systems (detailed below) within MVCU 110 to perform various functions such as unlocking a door, opening the trunk, setting personal comfort settings, modifying mobile vehicle functions, and calling from telematics unit 120. In facilitating interactions among the various communication and electronic modules 136, mobile vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, microprocessor, controller, host processor, or mobile vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the mobile vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a mobile vehicle communication network 112 that is connected to various electronic modules in the mobile vehicle. In one embodiment, these digital signals activate the programming mode and operation modes, as well as provide for data transfers.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless mobile vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice transmissions. In an alternative embodiment, communication services manager 174 communicates with telematics unit 120 in MVCU 110 through wireless carrier system 140, communication network 142, land network 144, and web hosting portals 160 using voice transmissions. Switch 172 selects between voice transmissions and data transmissions.

Figure 2:
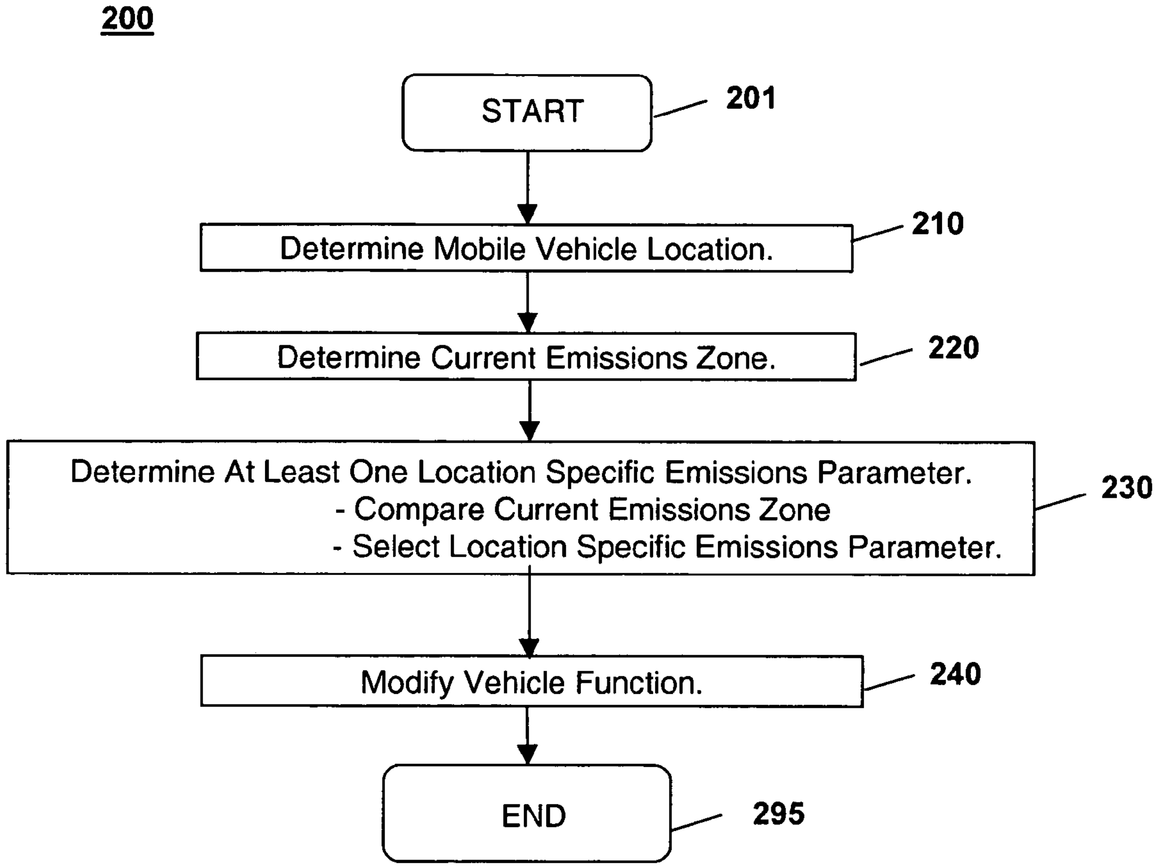
FIG. 2 illustrates a flowchart representative of one embodiment of a method for providing location specific fuel emissions compliance for a mobile vehicle in accordance with the present invention.

FIG. 2 illustrates a flowchart 200 representative of one embodiment of a method for providing location specific fuel emissions compliance for a mobile vehicle in accordance with the present invention. The method begins at step 201.

During step 210, a mobile vehicle location is determined at mobile vehicle 110. In one embodiment, the location is determined by the GPS unit 126, which provides longitude and latitude coordinates of the mobile vehicle responsive to a GPS broadcast signal received from one or more GPS satellite broadcast systems. In other embodiments, the location may be determined by any other method known to those of ordinary skill in the art, such as dead reckoning, odometer pulses, manual input, gyroscopes, accelerometers and magnetic compasses, or a combination of methods.

During step 220, a current emissions zone is determined based on the mobile vehicle location. For example, the current emissions zone is determined by reference to an emissions zone lookup table in one embodiment. The current emissions zone is correlated to the vehicle location at any given time. Emissions zones are defined geographic boundaries. Air quality standards and associated mobile vehicle fuel emission standards can vary, in some way, from those in adjoining zones. For example, mobile vehicle emission standards are often considered stricter in the state of California than in other adjoining states, therefore, the area defined by the borders of the state of California can be defined as an emissions zone. Emissions zones can encompass an entire state, individual municipalities, or other geographic or political divisions.

During step 230, at least one location specific emissions parameter is determined based on the current emissions zone in which the mobile vehicle is located. The emissions zone lookup table from step 220 is referenced to determine the location specific emissions parameter associated with the current emissions zone. The current emissions zone determined in step 220 is compared to a plurality of emissions zones stored in the emissions zone lookup table. A location specific emissions parameter is selected from the corresponding entry in the emissions zone lookup table based on the comparison.

Location specific emissions parameters are the mobile vehicle emissions standards required in a particular emissions zone. The location specific emissions parameters of interest are those that differ from those in neighboring zones. The emissions zone lookup table can include one or more vehicle functions and modification instructions that, once implemented, will allow the mobile vehicle to meet the required vehicle emissions standards. Location specific emissions parameters depend on vehicle type and include, but are not limited to a power source parameter, a fuel selection parameter, and an engine control parameter. In another embodiment, the telematics unit or another vehicle electronic module determines what vehicle functions to modify and how the modification is to be performed based on the location specific emissions parameters.

During step 240, upon determining at least one location specific emissions parameter; the telematics unit within the mobile vehicle will initiate the modification of one or more mobile vehicle functions. The modification of the mobile vehicle function will adjust the mobile vehicle's emissions to conform to the requirements of the affected area. For example, when the location specific parameter is an engine control parameter, a modification to a specified engine control function such as the ignition timing or the air/fuel mixture ratio is made. Other location specific emissions parameters include a power source parameter that modifies how a mobile vehicle receives power and a fuel selection parameter that modifies which fuel source the mobile vehicle is using.

During step 295, the method terminates.

Figure 3:
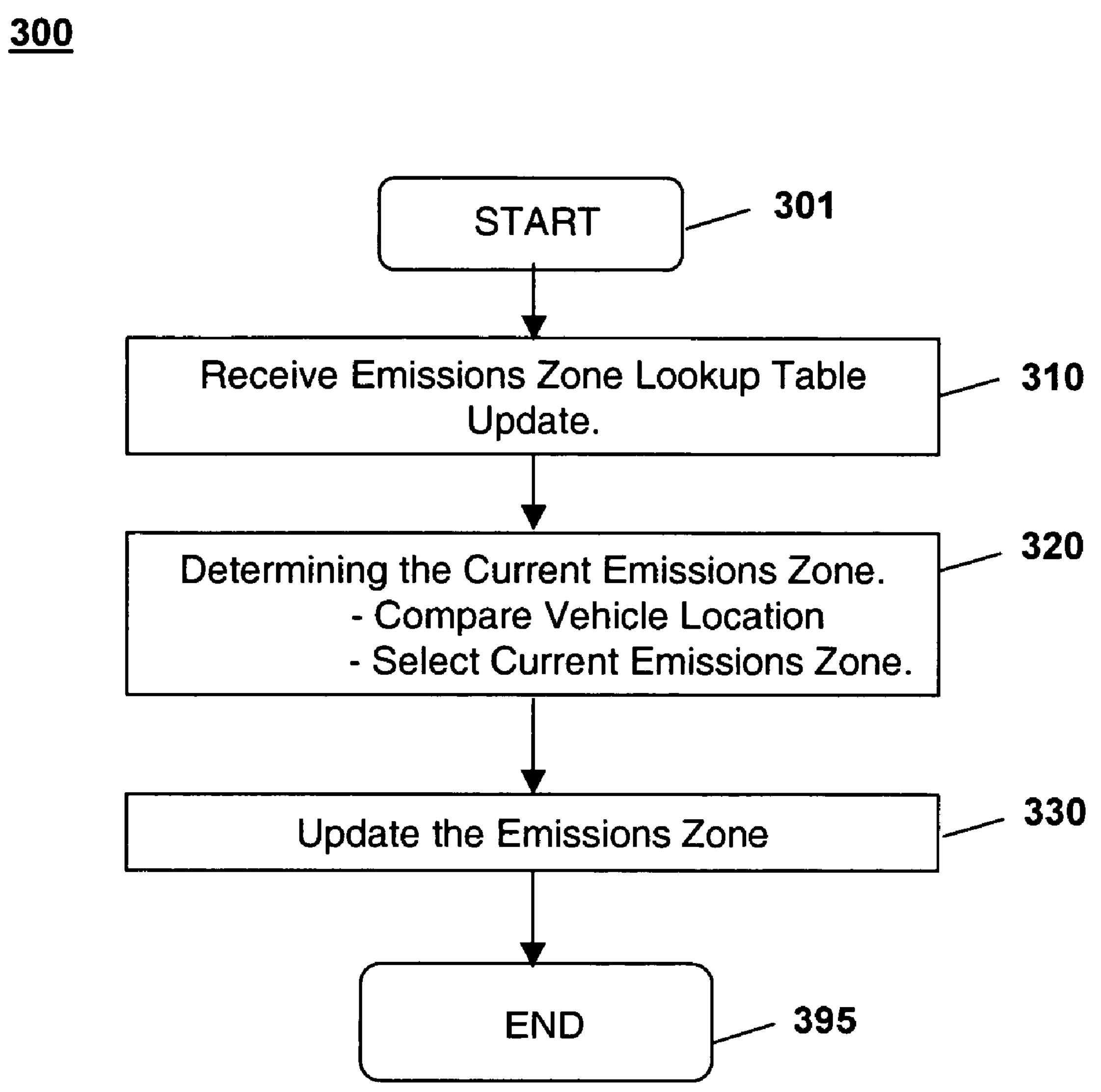
FIG. 3 illustrates a flowchart representative of one embodiment of a method for providing location specific fuel emissions compliance for a mobile vehicle in accordance with the present invention.

FIG. 3 illustrates a flowchart 300 detailing the step of determining a current emissions zone at 220 of FIG.2 in accordance with the present invention. The step detail begins at step 301.

During step 310, an emissions zone lookup table update is received at the telematics unit. Emissions zone lookup table updates are new versions or revisions of the emissions zone lookup table that include updated data. Emissions zone lookup table updates can be requested by the telematics unit or sent by the call center or third party provider when an update becomes available. The emissions zone lookup table update is an automated download received from a telematics call center or third party supplier, in one embodiment. In another embodiment, the emissions zone lookup table is located at the call center 170 in database 176, and the vehicle location is transmitted to the call center for processing prior to downloading the emission control parameters to the telematics unit 120.

During step 320, the current emissions zone is determined from the emissions zone lookup table. To determine the current emissions zone, the mobile vehicle location is compared to a plurality of emissions zone definitions stored in an emissions zone lookup table. The emissions zone lookup table can be a latitude/longitude table or other database containing the data required for determining the current emissions zone. The current emissions zone is selected from the corresponding entry in the emissions zone lookup table based on the comparison.

The emissions zone lookup table comprises a plurality of entries, with each entry including an emissions zone definition. Each emissions zone definition associates a range of GPS locations with a particular geographic area that comprises the emissions zone. The individual emissions zones are further associated in the emissions zone lookup table with the location specific emissions parameters for that zone. The emissions zone lookup tables are compiled by and supplied to the mobile vehicle by the call center or a third party supplier. These emissions zone lookup tables are stored in a table storage area, such as in-vehicle memory, and can be downloaded to a mobile vehicle via satellite broadcast or wireless carrier system. The emissions zone lookup tables can also be supplied to the mobile vehicle through an onboard data port connected to a data source such as a personal computer, PDA, or vehicle service computer.

During step 330, the emissions lookup table is updated with the emissions zone lookup table update. The updated emissions zone lookup table replaces and supercedes any and all previous versions of the emissions zone lookup table. In one embodiment, the emissions zone lookup table update replaces only those table entries, which have been changed.

During step 395, the method terminates.

Figure 4:
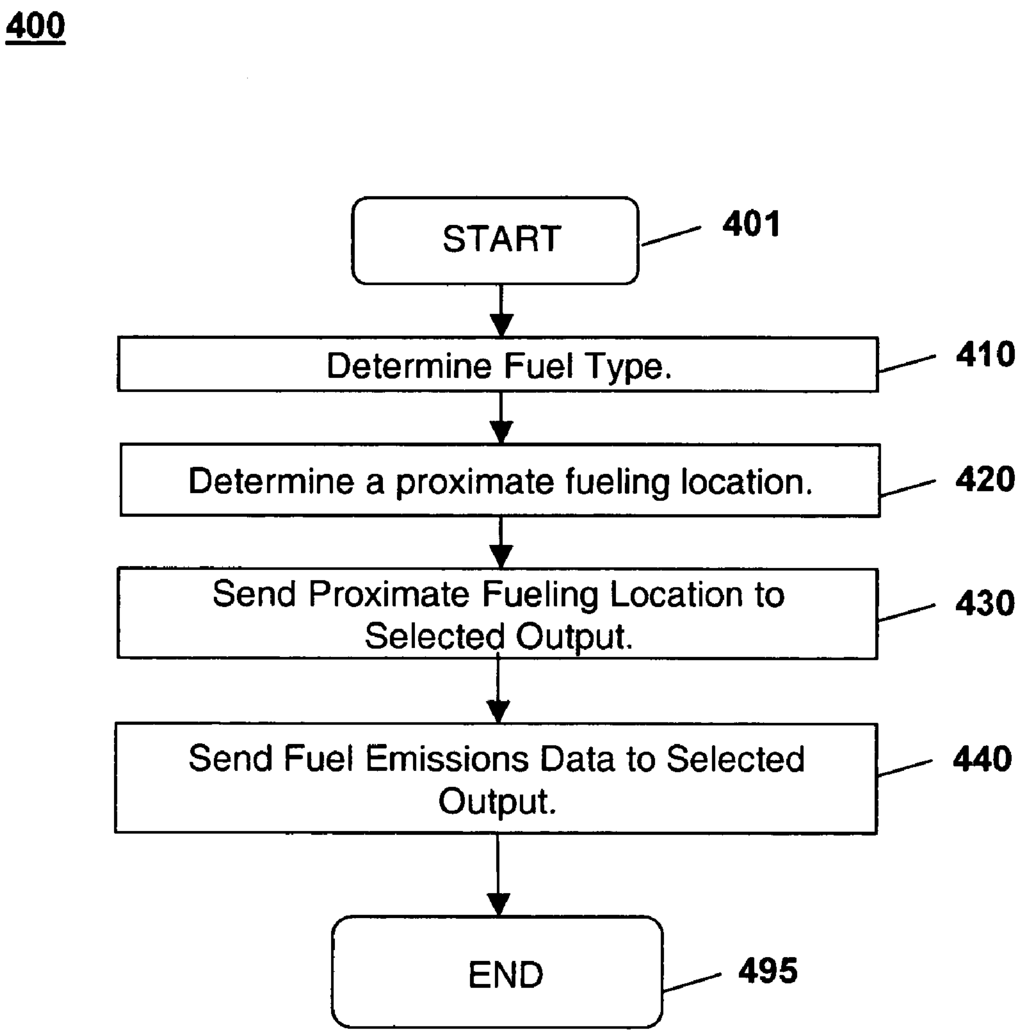
FIG. 4 illustrates a flowchart representative of one embodiment of a method for providing a proximate fueling location for a mobile vehicle in accordance with the present invention.

FIG. 4 illustrates a flowchart 400 representative of one embodiment of a method for providing a proximate fueling location for a mobile vehicle in accordance with the present invention. The method begins at step 401.

During step 410, at least one fuel type is determined. Fuel types include gasoline, electricity, hydrogen, methane, ethanol, methanol, natural gas, and diesel. In a non-hybrid fuel mobile vehicle, the fuel type is the fuel that the mobile vehicle is designed to use. In those mobile vehicles, the fuel type will not change unless the mobile vehicle is modified for a new fuel type. In a hybrid fuel mobile vehicle, more than one fuel type is determined. Each fuel type corresponds to one of the fuels the hybrid mobile vehicle is designed to use.

In one embodiment, for a hybrid fuel mobile vehicle, fuel consumption rates are determined for each fuel type a mobile vehicle uses. The fuel consumption rates are then used to determine when each fuel type needs to be replenished. A signal is sent to a selected output, such as an in-vehicle display, to inform the mobile vehicle operator when a fuel source must be located.

During step 420, a proximate fueling location is determined based on the mobile vehicle location and the fuel type determined in step 410. The proximate fueling location is the fueling station that is closest to the current location of the mobile vehicle. Because fueling stations for new fuel types being developed are not as common as a traditional gasoline stations, locating an available fueling station for these new fuel types can be difficult. Utilizing the telematics unit for providing updated fueling locations reduces this difficulty. The fueling locations are stored in a database that can be downloaded from a call center or third party provider to a mobile vehicle via satellite broadcast or wireless carrier system. Fueling locations can also be downloaded via the Internet and stored on a physical medium such as a CD, DVD, or memory card, or transferred to the mobile vehicle via wireless transmission or onboard data port. Examples of memory cards are compactflash (CF) cards, secure digital (SD) cards, multimedia (MMC) cards, xD cards and flash drives.

During step 430, the proximate fueling location is sent to a selected output for use by the mobile vehicle operator. The selected output can be a display within the mobile vehicle, a speaker within the mobile vehicle, a navigation system within the mobile vehicle, or a printer within the mobile vehicle. The selected output can also be a memory within the mobile vehicle from which the proximate fueling location can be recalled as needed. The selected output can also be a wireless transmission to a cell phone, PDA, handheld GPS, or other handheld device. The wireless transmission can be a Bluetooth transmission, 802.11 transmission, or cellular phone transmission. In another embodiment, the transmission uses a protocol according to the FCC Part 15 protocols. Other devices capable of displaying the output of the proximate fueling location determination can also be employed. In one embodiment, the identification of proximate fueling locations can be restricted or turned off.

During step 440, mobile vehicle fuel emissions data is sent to a selected output for use by the mobile vehicle operator. The mobile vehicle fuel emissions data includes engine performance information, measurements of specific pollutants, feedback on modifications made to vehicle functions, information regarding the current emissions zone, and information on fuel efficiency. The selected output is one of the selected outputs described in step 430.

During step 495, the method terminates.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for providing location specific fuel emissions compliance for a mobile vehicle, the method comprising:

determining a mobile vehicle location;

determining a current emissions zone based on the mobile vehicle location;

determining at least one location specific emissions parameter based on the current emissions zone;

modifying at least one mobile vehicle function based on the location specific emissions parameter, determining a fuel type;

identifying a proximate fueling location based on the mobile vehicle location and the fuel type; and sending the proximate fueling location to a selected output.

2. The method of claim 1, wherein the determining a current emissions zone comprises:

receiving an emissions zone lookup table;

determining the current emissions zone from the emissions zone lookup table; and updating the emissions zone lookup table with the emissions zone lookup table update.

3. The method of claim 2 wherein the determining the current emissions zone from the emissions zone lookup table comprises:

comparing the mobile vehicle location to a plurality of emissions zone definitions stored in an emissions zone lookup table; and selecting the current emissions zone based on the comparing.

4. The method of claim 1 wherein the determining at least one location specific emissions parameter comprises:

comparing the current emissions zone to a plurality of emissions zones stored in the emissions zone lookup table; and selecting the location specific emissions parameter based on the comparing.

5. The method of claim 1 further comprising:

sending mobile vehicle fuel emissions data to a selected output.

6. The method of claim 1 wherein the fuel type is selected from the group consisting of gasoline, electricity, hydrogen, natural gas, methane, ethanol, methanol, and diesel.

7. The method of claim 1 wherein the selected output is selected from the group consisting of a display, a speaker, a navigation system, a memory, a printer, and a wireless transmission.

8. A system for providing location specific fuel emissions compliance for a mobile vehicle, the system comprising:

means for determining a mobile vehicle location;

means for determining a current emissions zone based on the mobile vehicle location;

means for determining at least one location specific emissions parameter based on the current emissions zone;

means for modifying at least one mobile vehicle function based on the location specific emissions parameter, means for determining a fuel type;

means for identifying a proximate fueling location based on the mobile vehicle location and the fuel type; and means for sending the proximate fueling location to a selected output.

9. The system of claim 8 wherein the means for determining a current emissions zone comprises:

means for receiving an emissions zone lookup table update means for determining the current emissions zone from the emissions zone lookup table; and means for updating the emissions zone lookup table with the emissions zone lookup table update.

10. The system of claim 9 wherein the means for determining the current emissions zone from the emissions zone table comprises:

means for comparing the mobile vehicle location to a plurality of emissions zone definitions stored in an emissions zone lookup table; and means for selecting the current emissions zone based on the comparing.

11. The system of claim 8 wherein the means for determining at least one location specific emissions parameter comprises:

means for comparing the current emissions zone to a plurality of emissions zones stored in the emissions zone lookup table; and means for selecting the location specific emissions parameter based on the comparing.

12. The system of claim 8 wherein the fuel type is selected from the group consisting of: gasoline, electricity, hydrogen, methane, ethanol, methanol, natural gas, and diesel.

13. The system of claim 8 wherein the selected output is selected from the group consisting of a display, a speaker, a navigation system, a memory, a printer, and a wireless transmission.

14. A computer readable medium storing a computer program including computer program code for providing location specific fuel emissions compliance for a mobile vehicle comprising:

computer program code for determining a mobile vehicle location;

computer program code for determining a current emissions zone based on the mobile vehicle location;

computer program code for determining at least one location specific emissions parameter based on the current emissions zone;

computer program code for modifying at least one mobile vehicle function based on the location specific emissions parameter;

computer program code for determining a fuel type;

computer program code for identifying a proximate fueling location based on the mobile vehicle location and the fuel type; and computer program code for sending the proximate fueling location to a selected output.

15. The computer usable medium of claim 14 wherein the computer program code for determining a current emissions zone comprises:

computer program code for receiving an emissions zone lookup table update computer program code for determining the current emissions zone from the emissions zone lookup table; and computer program code for updating the emissions zone lookup table with the emissions zone lookup table update.

16. The computer usable medium of claim 15 wherein computer program code for determining the current emissions zone from the emissions zone lookup table comprises:

computer program code for comparing the mobile vehicle location to a plurality of emissions zone definitions stored in an emissions zone lookup table; and computer program code for selecting the current emissions zone based on the comparing.

17. The computer usable medium of claim 14 wherein computer program code for determining at least one location specific emissions parameter comprises:

computer program code for comparing the current emissions zone to a plurality of emissions zones stored in the emissions zone lookup table; and computer program code for selecting the location specific emissions parameter based on the comparing.

* * * * *